(12) United States Patent
Menard

(10) Patent No.: US 6,786,297 B1
(45) Date of Patent: Sep. 7, 2004

(54) SYSTEM FOR ACQUIRING GEOPHYSICAL DATA

(75) Inventor: Jean-Paul Menard, Thouare sur Loire (FR)

(73) Assignee: Sercel, Carquefou (FR)

( * ) Notice: Subject to any disclaimer, the term of this patent is extended or adjusted under 35 U.S.C. 154(b) by 0 days.

(21) Appl. No.: 09/869,231

(22) PCT Filed: Dec. 24, 1999

(86) PCT No.: PCT/FR99/03287

§ 371 (c)(1),
(2), (4) Date: Oct. 1, 2001

(87) PCT Pub. No.: WO00/39610

PCT Pub. Date: Jul. 6, 2000

(30) Foreign Application Priority Data

Dec. 24, 1998 (FR) .............................................. 98 16434

(51) Int. Cl.[7] ................................................ G01V 1/20
(52) U.S. Cl. ..................................... 181/112; 181/122
(58) Field of Search ................................. 181/122, 101, 181/102, 106, 108, 110–114, 104; 439/651

(56) References Cited

U.S. PATENT DOCUMENTS

| | | | | |
|---|---|---|---|---|
| 3,855,566 A | * | 12/1974 | Richardson | .................. 439/294 |
| 4,360,729 A | * | 11/1982 | Harvey et al. | ......... 250/227.24 |
| 6,091,670 A | * | 7/2000 | Oliver et al. | .................. 367/76 |

\* cited by examiner

*Primary Examiner*—Marlon T. Fletcher
*Assistant Examiner*—David S. Warren
(74) *Attorney, Agent, or Firm*—Blakely, Sokoloff, Taylor & Zafman

(57) ABSTRACT

A module is described for acquiring geophysical signals. The module includes at least one casing which is individually linked to one track. Each casing houses a processor which operates to digitize the geophysical signals. The module further includes two cable sections associated with each casing. Each cable section includes at a first end, a connector suitable for being coupled up to a complementary connector, and at a second end, an adapted configured to be fixed to a casing and to effect an electrical link with the processor housed in the casing.

18 Claims, 7 Drawing Sheets

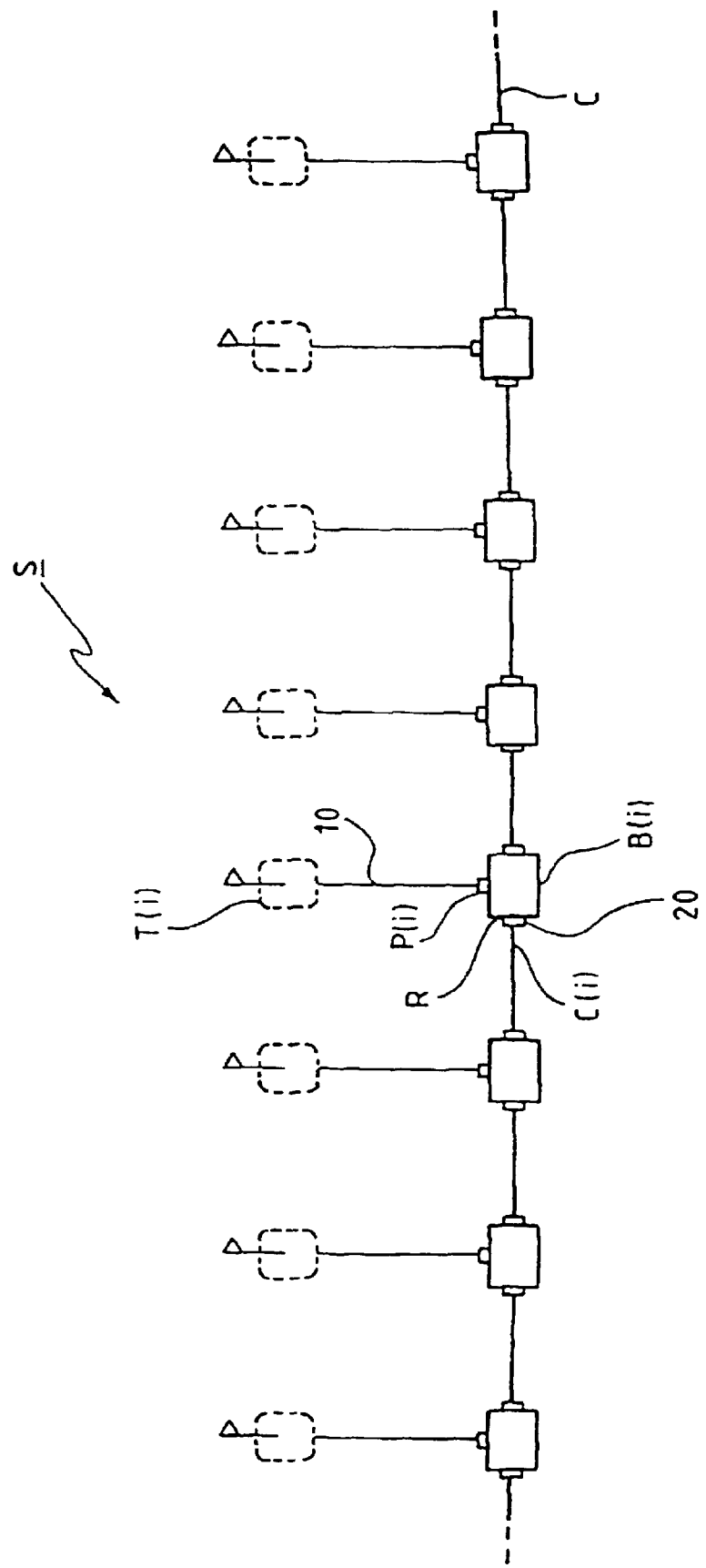

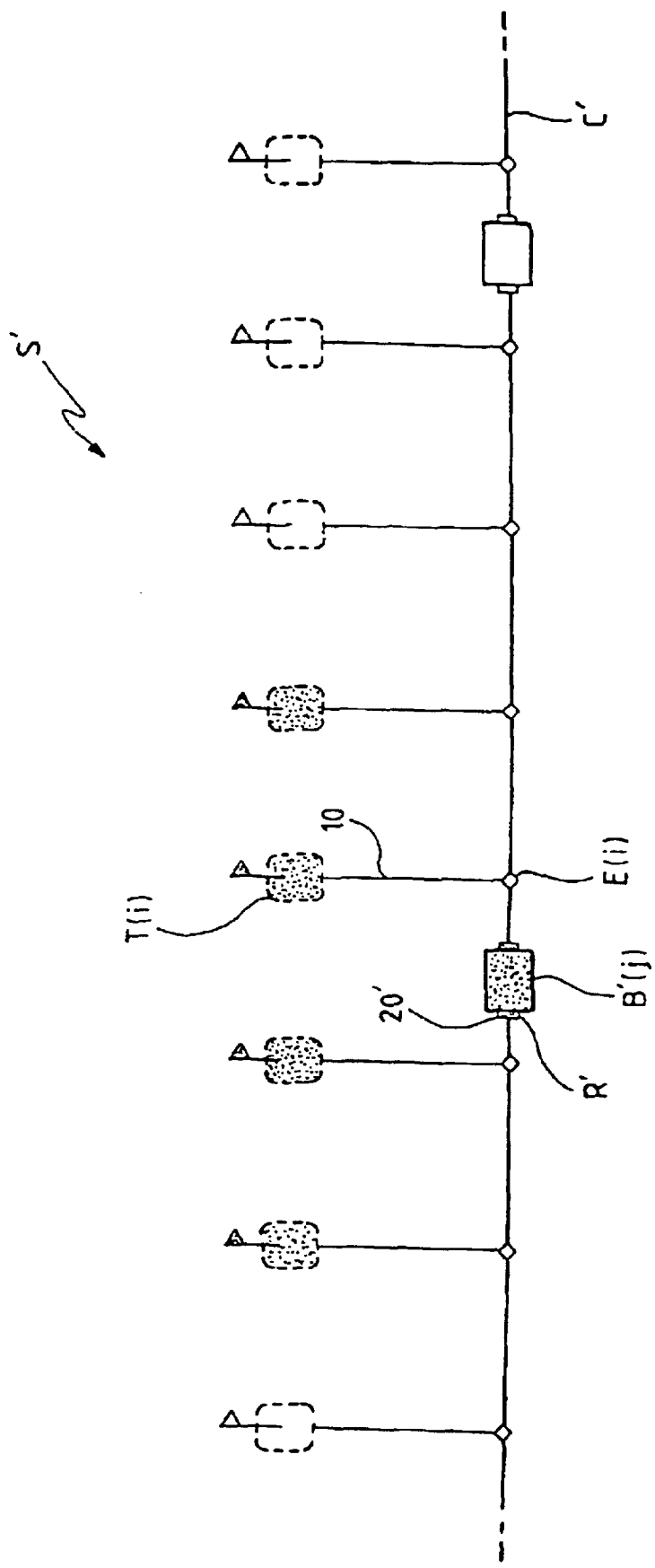

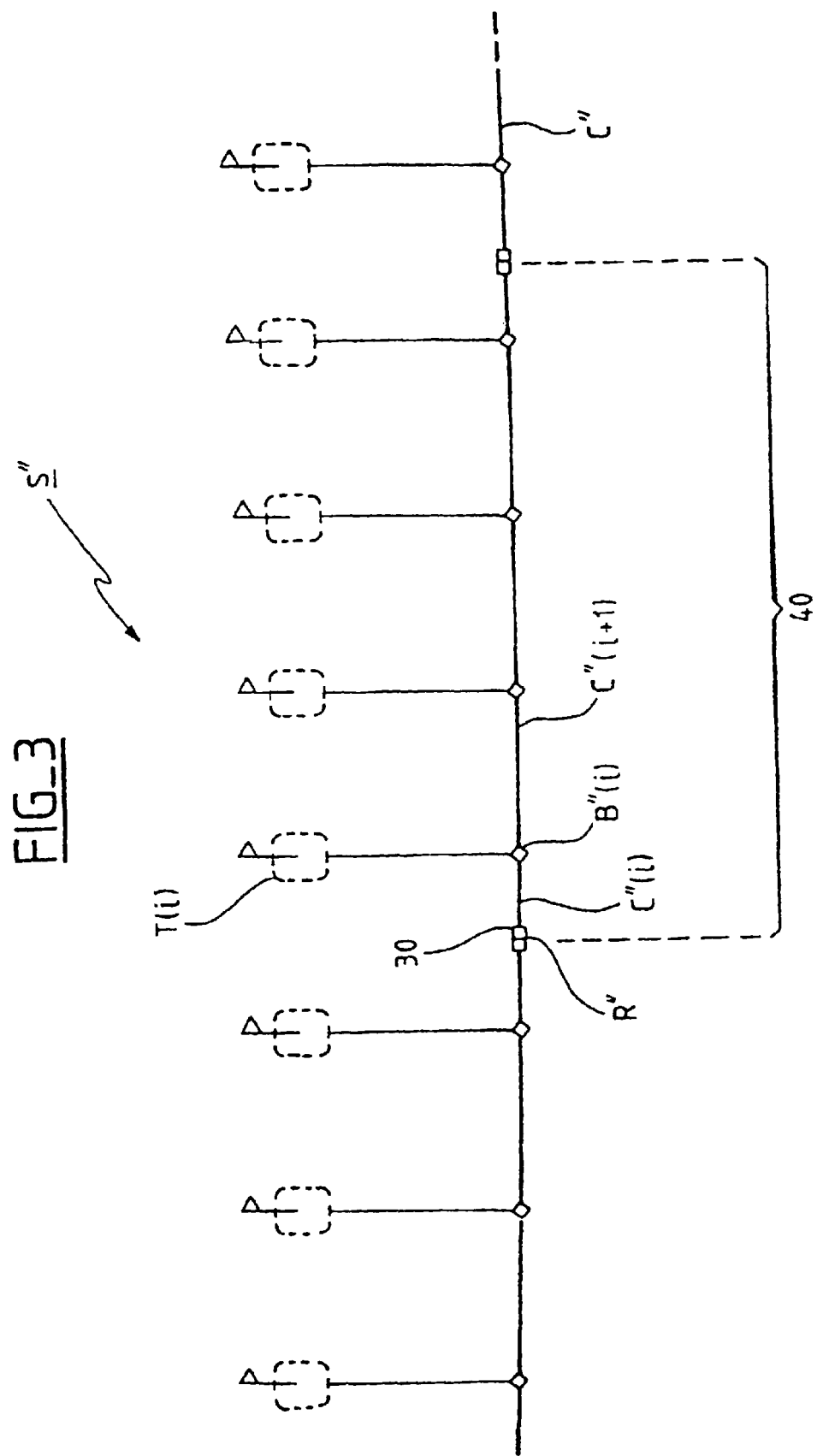

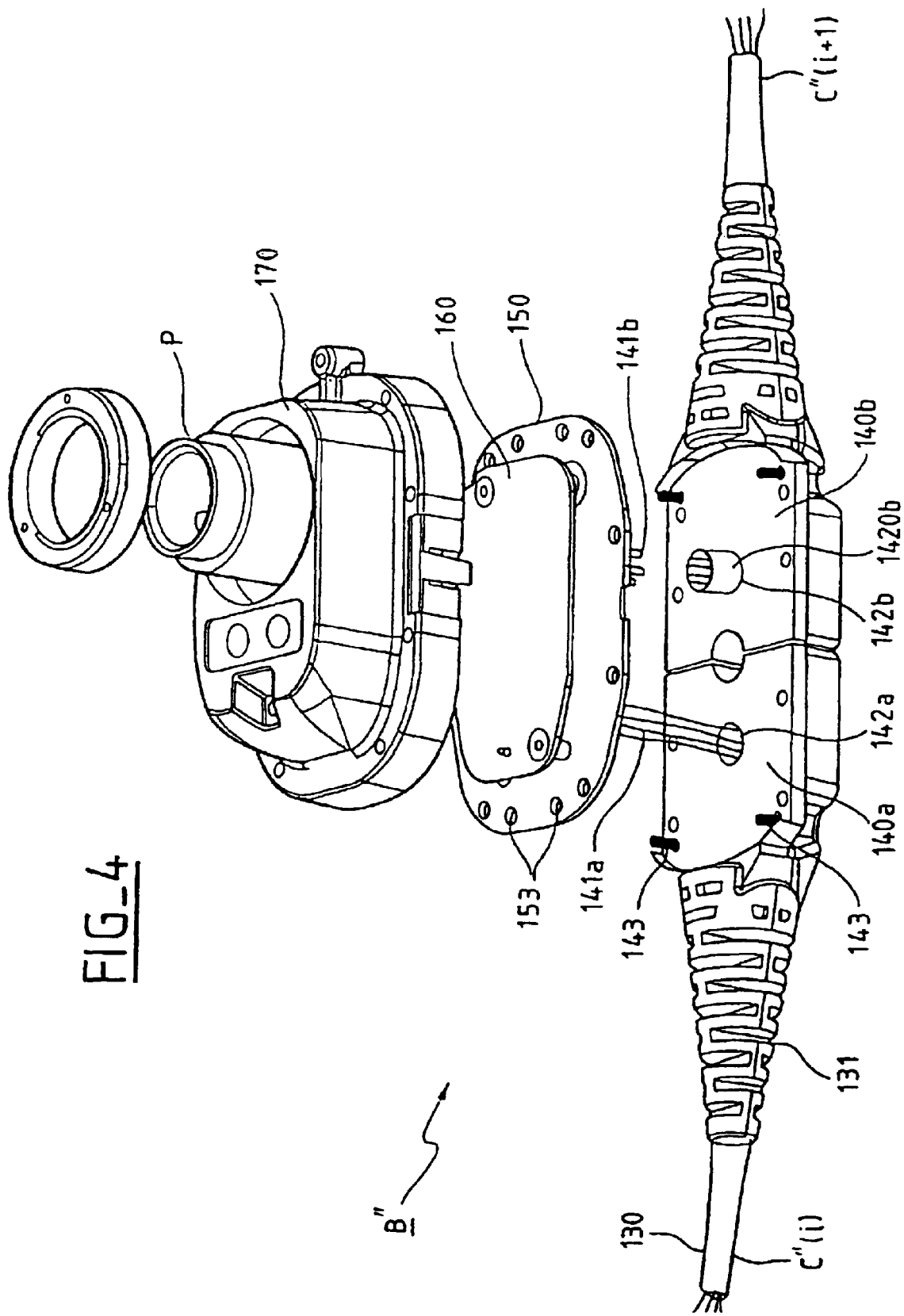
FIG_4

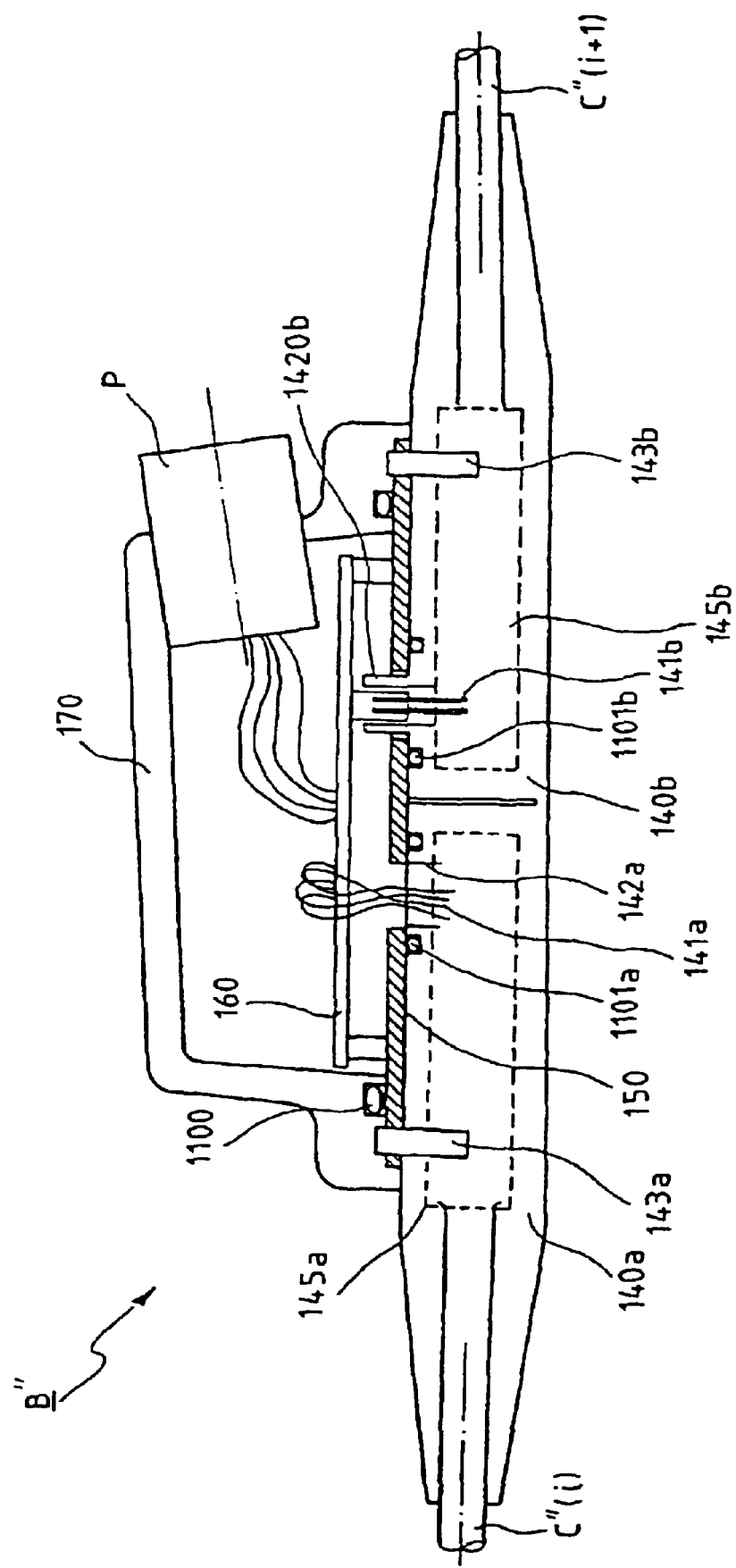
FIG_5a

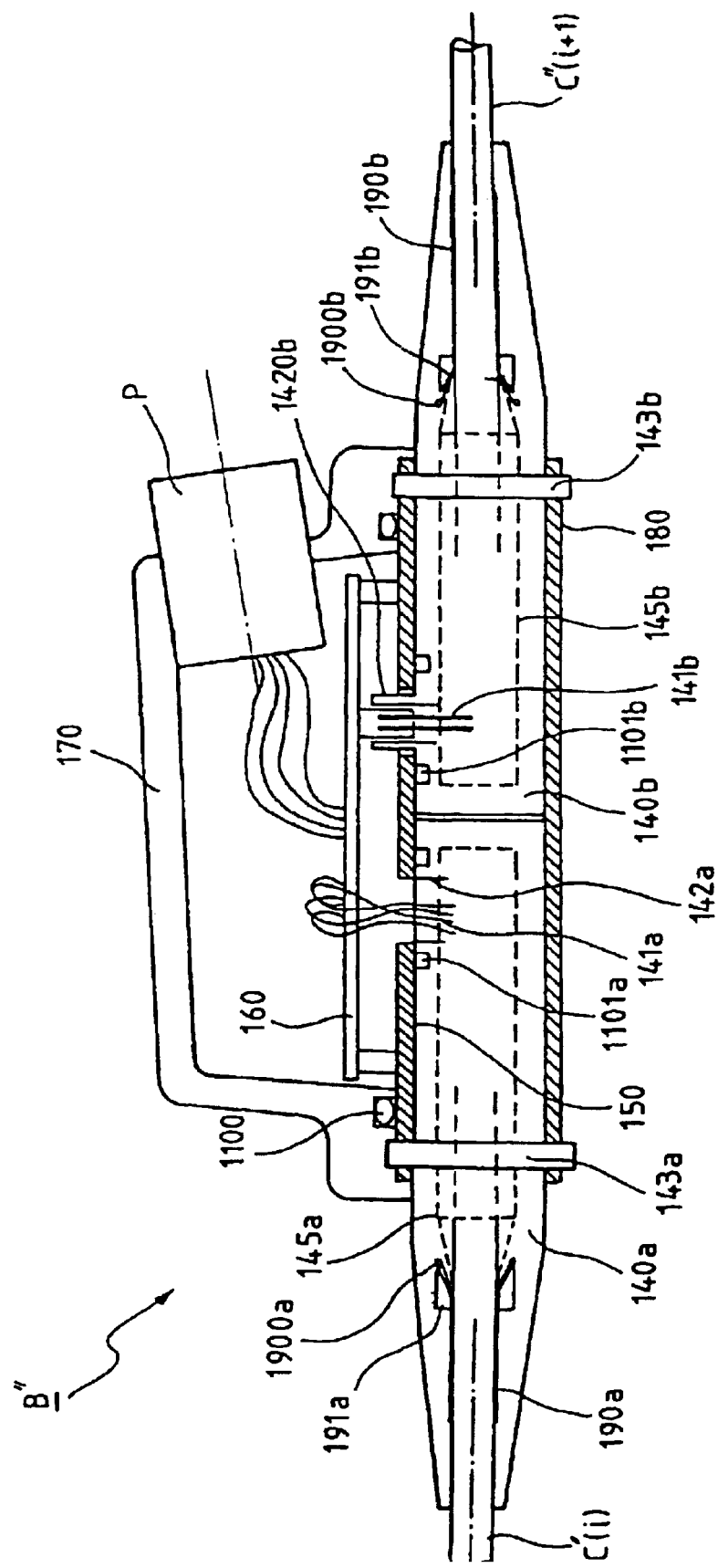
FIG_5b

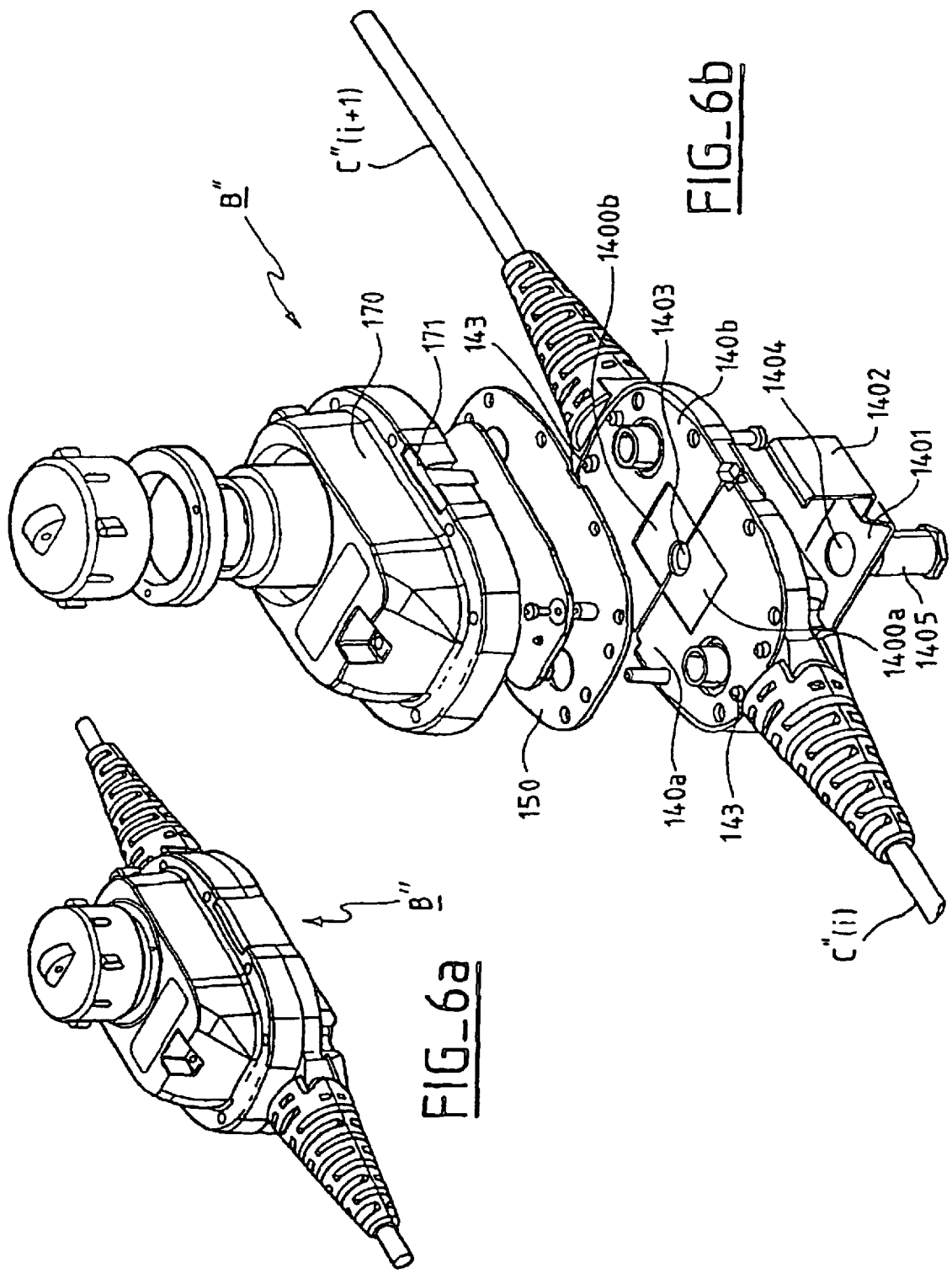

SYSTEM FOR ACQUIRING GEOPHYSICAL DATA

BACKGROUND

1. Field of the Invention

The present invention relates to systems deployed on-site on land or at sea for the acquisition of geophysical data.

2. Description of the Related Art

These systems use an assembly of sensors, linked by electrical cables to casings whose role is to process the data emanating from the sensors, in particular by digitizing the data and transmitting them to a central processing unit to which the casings are also linked by electrical cables. These casings can also comprise means making it possible to test the operation of the sensors and the digitizing of the data.

The known systems are generally designed according to one of the following two architectures, which will now be explained with reference to FIGS. 1 and 2:

- monotrack architecture (represented in FIG. 1),
- multitrack architecture (represented in FIG. 2).

FIG. 1 is a diagram representing a monotrack architecture. In this diagram, the geophysical data acquisition system S comprises a plurality of tracks T(i), each of which consists of an assembly of geophysical sensors.

Such tracks T(i) are well known and conventionally consist of n identical modules which each link in series or in parallel m geophysical sensors such as geophones whose analog output signal characterizes the response of the sub-surface strata to the signal emitted following the activation of one or more seismic sources.

The monotrack system S also comprises casings B(i) for digitizing the analog data emanating from the sensors of each track, and transmitting these data to storage means (not represented in the figure). Each track T(i) is thus linked to a respective casing B(i) by a cable 10 connected to a port P(i) of the casing, said cable conveying the analog data emanating from the sensors of the track T(i).

The casings B(i) comprise means for digitizing these analog signals, and for transmission to the storage means by way of a cable C which links the casings in series.

The cable C is composed of sections C(i) conveying the digital signals emanating from the casings B(i) as well as the electrical power supply required for the operation of these casings. Each section C(i) is furnished at each of its two ends with a connector 20 for coupling R with a casing. Each casing B(i) therefore comprises in addition to its port P(i) two connectors for cooperating with the connectors 20 of two cable sections.

The diagram of FIG. 2 represents a so-called "multitrack" or "N-track" system S', according to the second type of architecture commonly employed.

The multitrack system S' comprises casings B'(j) for digitizing and transmitting data, each casing being linked to N tracks T(i) (4 tracks for each casing in the instance of the system represented here, but N-track systems in which N is equal to 6 for example are also commonly used). Each track is for its part linked to a single casing, by way of a cable 10 conveying the analog data emanating from the sensors of the track.

An important difference as compared with the monotrack system S represented in FIG. 1 is that in the instance of the multitrack system, the cables 10 for transmitting analog data are linked to the casings B'(j) not directly by a port, but by way of a main cable C' to which the casings are linked in series and to which the cables 10 are coupled by so-called take-outs E(i) as they are widely known in the art.

The cable C' transmits, like the cable C of the monotrack system of FIG. 1, the digital data emanating from the casings to storage means, not represented in the figure.

An N-track system thus comprises N times fewer casings than tracks, each interval between two consecutive casings comprising N take-outs of which the first N/2 are linked to a first of the two casings, the other N/2 take-outs being linked to the second casing.

The cable C' of the multitrack system S' is more complex that the cable C of the monotrack system of FIG. 1. This cable C' thus comprises inside a single sheath:

- the extensions of the cables 10 for routing the analog data emanating from the tracks of sensors to the corresponding casing,
- conductors for transmitting digital data,
- at least one conductor for supplying power to the casings.

The casings B'(j) are linked to the cable C' by connectors of the casing cooperating with matching connectors 20' of the cable C' so as to constitute couplings R'.

In the two known architectures described hereinabove, the distance between two tracks T(i) is typically of the order of 50 meters. This distance is also that which separates two consecutive casings of a monotrack system, while the casings of an N-track system are separated by around (N×50) meters.

These two architectures each comprise advantages and drawbacks, which may be summarized as follows:

| Advantages of monotrack architecture (FIG. 1) | Advantages of multitrack architecture (FIG. 2) |
| --- | --- |
| Quality of the signal transmitted: the analog lines (from the track to the casing) are short and insulated from one another. Flexibility of deployment in the field (the cable C is simple and lightweight to handle, and it is therefore easy to tailor it to the local topography (so as to bypass obstacles for example) Simplicity of the main cable 10, and of the connectors of this cable with the casings B(i). Reduced size of the casing B(i) and of the cable C. | Reduction in the number of man cable/casing couplings (divided by 4 in the example of FIG. 2; by N in the general instance of a system with N tracks) and in the associated cost. Reduction in the number of casings and in the associated cost. |

| Drawbacks of monotrack architecture (FIG. 1) | Drawbacks of multitrack architecture (FIG. 2) |
| --- | --- |
| Large number of cable C/casing couplings (2 connections per track). Number of casings (1 per track); associated costs of equipment and handling. | Lack of flexibility (system whose basic element is an assembly of N tracks). Weight and complexity of the cable C'. Problems regarding the quality of the analog signals received by the casings B'(j): several neighboring strands contained within the same sheath convey low-level detectable analog signals, this possibly giving rise to crosstalk. Moreover, the sensitive analog links |

-continued

| |
|---|
| between the sensors of a track and their associated casing may be lengthy (for example 125 meters for a 6-track system). |

The two architectures described hereinabove have moreover common drawbacks:

Firstly, the number of couplings R or R' is sizeable, even if this number is reduced in the instance of a multitrack system. Since the data acquisition installations can be moved in the field, one and the same piece of hardware comprising the tracks and the casings is successively deployed and gathered up at various locations, this involving very many operations for making and undoing the multiple couplings of the system. It is therefore understood that this large number of couplings is especially detrimental in terms of cost of labor and timescales.

Another drawback common to both types of system is that each of the casings which they employ comprises two connectors for coupling with a main cable. The presence of these connectors on the casing constitutes a sizeable obstacle to the miniaturization of the casing, while present-day technological developments make it possible to substantially reduce the bulkiness of the other components of the casing. It would nevertheless be advantageous to reduce the size of the casings, which at present constitute voluminous elements of the systems and may be an impediment to the laying and gathering operations.

A third drawback common to present-day systems stems from the fact that it is sometimes necessary to supplement the couplings between the main cable and the casings with load take-up devices, such as portions of tension cables, one end of which is fixed to a part of the electrical cable close to the casing and the other end of which is mounted, in a removable or nonremovable manner, on the casing itself.

This arrangement may be necessary when the assembly formed by the cables and the casings is subjected to tensile loads, for example when submerging the assembly in water traversed by a strong current.

Such load take-up devices increase the complexity and the time required for employing the system, since when mounting and demounting casings provided with removable load take-up devices, the connecting and disconnecting of the electrical cables and of the casings must be accompanied by the mechanical stowing and unstowing of said load take-up devices.

Moreover, the load take-up device (comprising means on the casing, such as for example rings secured to the casing) constitutes just like the connectors an obstacle to the miniaturization of the casings.

Furthermore in the two known types of architecture, it is necessary to handle two families of objects having very different dimensions: the casings and sections of the main cable on the other hand, with specific logistics suited to each family.

However, there is nowadays a desire to gradually move the operations for laying and gathering the acquisition systems toward greater automation, so as to cut the associated labor costs and reduce the duration of these operations. Such movement is made tricky nowadays by the fact of having to handle these two families of objects.

Finally, it has been seen that the two architectures each exhibited drawbacks. The operators must therefore determine, on the basis of the specifics of the geophysical data acquisition campaign to be carried out, the suitable architecture. This implies that in many instances no choice of architecture will be optimal, and that the operators must have access to the hardware required for implementing the chosen architecture, this leading to overequipment or to hiring which is detrimental in terms of costs.

SUMMARY

A purpose of the invention is to make it possible to produce systems for acquiring geophysical data which are economical to manufacture and utilize by virtue of the sizeable reduction in the number of connectors employed in these systems.

A second purpose of the invention is to facilitate the operations for laying and gathering the acquisition systems by harmonizing the format of their components (which at present comprise casings and cables, the formats of these two types of components being very different).

A third purpose of the invention is to make it possible to produce a system in which the casings are of substantially smaller dimensions than the dimensions of present-day casings.

Another purpose of the invention is to make it possible to produce systems according to the objectives hereinabove, in which the casings may be subjected to sizeable tensile loads (of the order of 500 Newtons for utilization on land, and of the order of 2 500 Newtons for utilization in a wet environment of the "shallow water" type to use the widespread terminology), while still having reduced dimensions (of the order of 200 cm$^3$)

In order to achieve these purposes, the invention proposes a module for acquiring geophysical signals, comprising:
  at least one casing B"(i), B", which houses processing means including means for digitizing the signals,
  and two cable sections C"(i) each comprising:
    at a first end, a connector suitable for being coupled up to a complementary connector,
    at a second end, an adapter designed to be fixed to the casing and to effect an electrical link with the processing means housed in the casing.

Preferred but nonlimiting aspects of the system according to the invention are the following:
  it comprises at least two casings, linked in series by cable segments, comprising at each end an adapter designed to be fixed to the casing and to effect an electrical link with the processing means housed in the casing.
  each casing comprises a rigid member fixed on one face of the respective adapters secured to the respective cable sections or segments, so as to take up a sizeable part of the tensile loads exerted between these two cable sections or segments.
  each casing comprises means for attaching the adapters of the cables to the rigid member.
  the means for attachment are rigid lugs, a part of which is embedded in the adapter, another part of each lug projecting from the adapter toward the rigid member and engaged in a respective orifice of the rigid member along a direction substantially perpendicular to the direction of the part of the cable sections or segments which is adjacent to the casing.
  processing means integrated into the cable adapters comprise spark arresters.
  the rigid member carries means for processing electrical signals.
  each casing comprises leaktightness means.

the leaktightness means comprise a seal placed in a space circumscribed by the lugs.

at least one casing comprises a platen situated on a second face of the cables which is opposite the first face and is substantially parallel to the rigid member.

parts of the lugs which project toward the platen are engaged in orifices of said platen.

the cable section end connectors are mechanically and electrically hermaphrodite and are identical.

the adapter situated at the second end of each cable section is designed to be fixed in a removable manner to a casing.

the casings comprise a port for the connection of at least one geophysical sensor outside the casing.

Other aspects, purposes and advantages of the present invention will become more apparent from reading the following detailed description of a preferred embodiment thereof, given by way of example and with reference to FIGS. 3 to 6b of the appended drawings, in which drawings:

BRIEF DESCRIPTION OF THE DRAWINGS

FIG. 1 is a diagrammatic representation of a geophysical data acquisition system according to a first known type of architecture, FIG. 2 is a diagrammatic representation of a geophysical data acquisition system according to a second known type of architecture different from the type of FIG. 1, FIG. 3 is a diagrammatic representation of a geophysical data acquisition system architecture according to the invention, FIG. 4 is an exploded diagrammatic view of the main components of a first embodiment of a casing of a system according to the invention, FIGS. 5a and 5b are two sectional diagrammatic views of two variants of a second embodiment of a casing of a system according to the invention, FIGS. 6a and 6b are a perspective view and an exploded view of a third embodiment of a casing of a system according to the invention.

DETAILED DESCRIPTION

With reference to FIG. 3, there is represented a geophysical data acquisition system S" according to the invention.

Like the known systems, it comprises a plurality of tracks T(i) linked to data storage means (not represented) by way of a cable C".

More precisely, like in the monotrack systems, each track T(i) is linked individually to a respective casing B"(i).

However, in contrast to the known systems represented in FIGS. 1 and 2, no connector for electrical linking with the central processing unit or the interlinking of the casings is fixed on the casings. In the system according to the invention, each casing B"(i) is associated with two cable sections C"(i) and C"(i+1) for electrical connection with the neighboring casings.

The two cable sections C"(i) and C"(i+1) are fixed on the casing B"(i), preferably being aligned on either side of the casing. The structure of the link between the cable sections and the casing will be described with reference to FIGS. 4, 5a, 5b and 6b.

Each cable section C"(i) is furnished at a first end with means of coupling with a casing B"(i), the second end of the section C"(i) possibly being identical to the first and also being furnished with means of coupling with a casing, or else comprising an electrically and mechanically hermaphrodite connector 30 which can be connected to another identical connector.

The casings B"(i) are thus linked in series by way of the means of end coupling of the cable sections, to constitute modules 40 whose two ends are furnished with a connector 30 for coupling R" with the neighboring module.

The module 40 represented in FIG. 3 comprises four casings B"(i) each linked to a track T(i). According to the invention, the number of casings of a module may be arbitrary, the module possibly comprising just a single casing, or several thereof.

It is therefore understood that:

on the one hand, the number of couplings R" is divided by two as compared with the known systems comprise the fewest couplings (multitrack systems). Specifically, the implementation of an N-track multitrack system requires two couplings per casing, and hence 2/N couplings per track. In the system according to the invention, this ratio is still divided by two, to a value of 1/N coupling per track.

on the other hand, the casings B"(i) do not directly carry connectors, thereby making it possible to design them with reduced size, as will be seen with reference in particular to FIG. 4.

With reference now to FIG. 4, there is represented an exploded view of a casing B" of an acquisition system according to the invention with its two identical cable sections C"(i) and C"(i+1).

The section C"(i) comprises in its sheath 130 the assembly of electrical conductors required for coupling with the central processing unit or with other casings B", so as to convey the data emanating from sensors linked to the casings of the acquisition system.

This section is furnished at a first end remote from the casing with a connector, not represented in the figure, which can be mechanically and electrically coupled with an identical connector secured to another casing or to a central processing unit.

The second end of the section C"(i) is coupled electrically to means of processing the signals fixed on a rigid plastic insert (the insert and its processing means not being represented). These processing means can in particular comprise overvoltage limiters (which may use spark arresters).

The sheath of the section C"(i) is also engaged in a conduit of the insert in which the section C"(i) follows an "S" route so as to bypass baffles inside the conduit. Thus the section C"(i) and the insert are also mechanically secured (the baffles of the conduit defining passages whose width is scarcely greater than the diameter of the sheath of the cable section), their mechanical link being able to withstand a tension of the order of 500 Newtons.

An overmolding of a semi-rigid plastic identical to that of the sheath of the cable is produced around the cable section C"(i), around the insert and around its processing means. This overmolding unites into a single member a part 131 surrounding the part of the section C"(i) which is adjacent to the insert, and an adapter of generally flattened form 140a which constitutes the part of the overmolding which is most remote from the section C"(i). The material of this overmolding can for example be polyurethane.

The ribbed geometry of the part 131 renders it sufficiently flexible to allow certain deformations of the cable section which it surrounds, but sufficiently rigid to limit these deformations to the interior of a specified angular cone.

By thus limiting the curvature of the cable section located in proximity to the casing, the overmolding part 131 maintains the link between the cable section and the casing of shearing loads which may damage this link.

This overmolding, which covers the end of the cable section and the means of processing of the insert, also comprises a conduit 142a directed perpendicularly to the section C"(i), affording access from outside to the means of processing of the insert.

This conduit emerges outside the overmolding on an essentially plane face of the adapter 140a, said face being the so-called upper one. It constitutes the only point affording access to the interior of the overmolding, the sheath of the cable section having reacted thermally with the plastic of the overmolding to constitute an otherwise leaktight assembly.

Two variant embodiments of the invention, corresponding to two respective solutions for electrically linking the elements of the casing, are brought together in the exploded view of FIG. 4:

in the left part of the figure, conducting wires 141a are connected to the processing means of the insert and exit the adapter 140a via the conduit 142a, in a preferred variant represented in the right part of the figure, the conduit 142b of a second adapter 140b, otherwise identical to the first adapter, is extended upwards by a duct 140b. The second adapter 140b lies within an overmolding surrounding a second cable section C"(i+1)) identical to C"(i) and a second insert identical to that of the adapter 140a.

Two rigid lugs 143 project perpendicularly from the upper face of the adapter 140a. The lower part of these lugs, which is embedded in the rigid insert, is fairly sizeable so that the anchoring of the lugs in the insert can withstand without damage shearing loads of the order of 2 550 Newtons applied parallel to the upper face of the adapter on the projecting part of the lugs.

In the diagram of FIG. 4, the two adapters 140a and 140b are in the position of mounting of the casings. In this position, the adapters are placed in such a way that their respective upper faces are adjacent and define a single plane, and the sections C"(i) and C"(i+1) are aligned. The faces of mutual contact of the two adapters are generally plane and perpendicular to the axis of the sections C"(i) and C"(i+1).

Represented above the adapters thus assembled is a platen 150 whose surface corresponds to the uniting of the two upper faces of the adapters.

This platen is made from a rigid metallic material such as steel, and is drilled with four holes 153 located opposite the lugs of the two adapters when the latter are in contact in the position of mounting of the casing. These holes 153 have a diameter corresponding to that of the lugs.

A second platen 160 is fixed on the upper face of the platen 150, remote from the adapters 140a and 140b. This second platen also carries means for processing the signals which may be produced in the form of a printed circuit placed for example on the lower face of the platen 160 and linked:

to the conductors 141a of the adapter 140a in the variant in the left part of the figure, two connection pins 141b which can be engaged in the duct 1420b for connecting with the processing means of the adapter 140b in the preferred variant in the right part of the figure.

Whatever variant embodiment is chosen, the conductors 141a and the pins 141b each pass through an orifice of the platen 150 (not visible in the figure) for connection with the processing means of the adapters.

When the casing is mounted, the platen 150 sits on the adapters 140a and 140b, each of the lugs 143 being engaged in one of the four orifices 153 of the platen so as to guarantee the anchoring of the two adapters in the directions parallel to their upper faces.

A cover 170 covering the two platens 150 and 160 from above comprises a port P for the connecting of a measurement point, not represented in the figure. The plugs of this port are linked to the processing means of the platen 160 by pins or conductors, also not represented in the figure for the sake of clarity.

When the casing B" is closed, the inserts of the two adapters, the platen 150 and the cover 170 are fixed together by s crews passing through orifices of the platen 150 and make it possible as will be seen to construct a completely leaktight assembly.

The casing B" of the acquisition system according to the invention does therefore not comprise on its main body (materialized by the two adapters and the cover) any connector for coupling with other casings, the hermaphrodite connectors for such coupling possibly being shifted to the extremity of the cable sections C"(i) and C"(+1).

An advantageous consequence thereof is that this casing B" may be of especially reduced dimensions—of the order of 200 cm$^3$, while the casings of present-day systems have a volume which commonly reaches several liters.

Moreover, the take-up of load by the lugs 143 makes it possible to dispense with the additional devices for taking up loads alluded to hereinabove, which were not integrated into existing casings.

Specifically, in the system according to the invention the tensile loads between the cables interlinking the casings or linking them to a central processing unit are taken up by the succession of the following elements:

sheath of the cable (and possibly additional armor of the cable made of Kevlar (registered trademark) in the case of a reinforced link) which is linked to a first side of the casing, link between the end of the c able and a first insert of the adapter. This link is as has been seen effected by engaging the sheath of the cable between baffles of the insert, but may also as will be seen more particularly with reference to FIG. 5b, employ the clamping of the end of a Kevlar (registered trademark) armor in the case of a reinforced link, lugs projecting from the first insert and from the first associated adapter, platen in which the projecting lugs are engaged (and possibly second platen as described later with reference to FIG. 5b), lugs of the second adapter of the casing, insert of the second adapter, sheath of the second cable section linked to a second side of the casing.

By dispensing with the conventional load take-up devices it is thus also possible to eliminate the drawbacks cited above and related to the conventional load take-up devices.

FIG. 5a is a longitudinal sectional view diagrammatically representing a second embodiment of a casing B" according to the invention, and intended to be employed on land, said casing now being assembled. The two variant embodiments already represented in FIG. 4 are found again in the right and left parts of this figure respectively.

Found again in this figure are the two cable sections C"(i) and C"(i+1) which are aligned on either side of the casing. The end adapter 140a of the section C"(i) is in contact with the end adapter 140b of the section C"(i+1). The platen 150 is fixed (by conventional means not represented such as screws, which also hold the cover 170 on the plane upper faces of the two adjacent adapters, and on its upper face carries the platen 160 which comprises means for processing the signals, said signals being conveyed by:

the electrical conductors 141a which pass through the conduit 142a of the adapter 140a so as to be in electrical contact with the processing means contained inside this adapter (variant in the left part of the figure), the pins 141b engaged in the duct 1420b (which extends inside the adapter 140b up to the processing means through another conduit), and connected with the processing means contained inside the adapter 140b (variant in the right part of the figure).

In both instances, the conductors 141a and the pins 141b each pass through a respective conduit of the platen 150.

FIG. 5b illustrates a different configuration of the lugs 143a and 143b of the respective adapters 140a and 140b. Here, as in FIG. 4, the lugs are partially embedded in the insert 145a, 145b of their associated adapter, but project perpendicularly from the two faces (upper and lower) of said adapter.

Their projecting upper part is engaged just like,that of the lugs 143 of FIG. 4 in an orifice of the platen 150, their projecting lower part being moreover engaged in an orifice of an additional platen 180 sitting on and screwed to the plane lower face of the two adapters 140a and 140b which are then "sandwiched" between the two platens 150 and 180.

This variant embodiment—second load take-up platen 180 and lugs likewise projecting downwards so as to anchor the adapters to this second platen—is advantageous in the instance where the two sections of cable of the casing may be subjected to a sizeable tension (of the order of 2 500 Newtons). It thus constitutes a preferred variant embodiment when employing the casing at sea or in wet surroundings of the "shallow water" type.

In practice, such a device is designed to withstand tensions of the order of 2 500 Newtons, while the first embodiment involving only upward projecting lugs as represented in FIG. 4 permits longitudinal loads of the order of 500 Newtons.

FIG. 5b also illustrates a variant embodiment of the mechanical link between the sections C"(i), C"(i+1) and the respective inserts 145a, 145b of the respective adapters 140a, 140b. To withstand sizeable tensions, each cable section can be reinforced with an additional sheath 190a, 190b made of Kevlar (registered trademark) whose end adjacent to the corresponding adapter 140a, 140b exhibits a thickening 1900a, 1900b clamped in a respective conical nut mechanism 191a, 191b embedded in the overmolding of the respective adapter.

The geometrical configuration of the casing represented in FIGS. 5a and 5b is a little different from that of the casing of FIG. 4. Specifically, in this instance, the port P for connecting a measurement point is not situated perpendicularly to the upper face of the cover 170 of the casing, but is slanted. This characteristic in no way modifies the functionalities of the casing.

Also represented in FIGS. 5a and 5b are the means making it possible to guarantee the leaktightness of the device which may be exposed to aggressive surroundings involving for example dust or water liable to penetrate the casing and damage its components.

Accordingly, there is provided an O-ring seal 1100 disposed in a bore of the cover 170 and intended to guarantee the leaktightness between the cover 170 and the platen 150.

There is also provided an O-ring seal 1101a housed in a circular cavity flush with the upper face of the adapter 140a and surrounding the orifice made in the platen 150 which faces the conduit 142a for the passage of the conductors 141a when the platen 150 is sitting on the adapter.

This seal 1101a thus guarantees the leaktightness of the passage of the conductors 141a. Likewise, an O-ring seal 1101b is provided in a circular cavity emerging on the upper face of the adapter 140b so as to guarantee the leaktightness of the passage of the pin 141b.

FIGS. 6a and 6b depict a third embodiment of a casing B".

FIG. 6b reveals two adapters 140a and 140b intended to be assembled by way of the lugs 143 and the platen 150.

This figure also shows two electrically conducting plates 1400a and 1400b housed in respective recesses of the upper faces of the two adapters in such a way as to lie along the extension of said upper faces.

These two plates are made in one piece each with two axes which cannot be seen in the figure, housed in conduits which pass through the upper wall of the adapter so as to place each plate in electrical communication with the circuit carrying the means of processing the signals of the insert of the associated adapter.

FIG. 6b also shows a metallic and electrically conducting strap 1401 intended to be mounted on the lower face of the casing, the bent-back ends of its two branches (of which only branch 1402 is visible in the figure) being engaged in cavities 171 of the lid 170 when the casing is mounted, so as to further improve the cohesion of the assembly.

In FIG. 6b it will be observed that the adapters 140a and 140b define when they are assembled a central well 1403 which passes right through the assemblage formed by the two adapters and emerges toward the bottom of the casing on the strap 1401.

This strap 1401 also comprises an orifice 1404 aligned with the well 1403 when the strap is mounted on the casing.

A metal finger 1405 visible in FIG. 6b is engaged, when the device is mounted, in the orifice 1404 and the well 1403 in such a way as to come into contact with the plates 1400a and 1400b. This finger is electrically conducting and thus allows the strap 1401 to be linked electrically to the circuits of the inserts of the two adapters carrying the means of processing the signals, by way of the finger 1404 and of the plates 1400a and 1400b.

The finger 1405 can be secured with a spike (not represented), also electrically conducting and intended to be driven into the ground, said spike then simultaneously ensuring:

the securing of the casing B" to the ground when used on land, and the earthing of the circuits of the inserts carrying the means of processing the signals by way of the strap 1401 which thus constitutes an earth strap.

When employed at sea, the device does not comprise any spike associated with the finger 1405 which is in contact with the water as well as the strap 1401, these two elements thus also effecting the earthing of the circuits of the inserts.

It will be observed that the casing B" described hereinabove is easily dismountable, the cable sections C"(i) and C"(i+1) each being able to abut at their end remote from the casing either with an adapter of a neighboring casing, or with a connector terminating a module 40 such as represented in FIG. 3, comprising several casings linked in series.

In a variant embodiment not represented in the figures, it is also possible to overmold the assembly which can then no longer be dismounted but whose robustness is increased through said overmolding.

It is thus apparent that the system according to the invention makes it possible:

to make substantial manufacturing savings by at most halving the number of connectors employed between the modules, to make the system reliable by reducing the number of connections, to standardize the format of the components of the system and thus to facilitate their handling, to facilitate the handling of the system by virtue of the miniaturization of the casings and the integration into the body of the casings of the load take-up means, simply and rapidly to deploy "clusters" consisting of casings mounted in series, it being possible for example for said clusters to be wound around a reel by virtue of the reduced volume of the casings.

What is claimed is:

1. A module for acquiring geophysical signals, comprising:
at least one casing which is individually linked to one and only one track, which houses processing means including means for digitizing the signals, each casing being associated with a track,
and two cable sections each comprising:
at a first end, a connector suitable for being coupled to a complementary connector,
at a second end, an adapter configured to be fixed to a casing and to effect an electrical link with the processing means housed in the casing, wherein the two cable sections are separated by at least one casing.

2. The module as claimed in claim 1, further comprising at least two casings, linked in series by cable segments each of which comprises at its two ends an adapter configured to be fixed to a casing and to effect an electrical link with the processing means housed in the casing.

3. The module as claimed in claim 1, wherein each casing comprises a rigid member fixed on one face of the respective adapters secured to the respective cable sections or segments, so as to take up a sizeable part of the tensile loads exerted between these two cable sections or segments.

4. The module as claimed in claim 3, wherein each casing comprises means for attaching the adapters of the cables to the rigid member.

5. The module as claimed in claim 4, wherein the means for attachment are rigid lugs, a part of which is embedded in the adapter, another part of each lug projecting from the adapter toward the rigid member and engaged in a respective orifice of the rigid member along a direction substantially perpendicular to the direction of the part of the cable sections or segments which is adjacent to the casing.

6. The module as claimed in claim 1, wherein processing means integrated into the cable adapters comprise spark arresters.

7. The module as claimed in claim 3, wherein the rigid member carries means for processing electrical signals.

8. The module as claimed in claim 5, wherein each casing comprises leaktightness means for providing leaktightness between a cover and the rigid member.

9. The module as claimed in claim 8, wherein the leaktightness means comprise a seal placed in a space circumscribed by the lugs.

10. The module as claimed in claim 5, wherein at least one casing comprises a platen situated on a second face of the cables which is opposite the first face and is substantially parallel to the rigid member.

11. The module as claimed in claim 10, wherein parts of the lugs which project toward the platen are engaged in orifices of said platen.

12. The module as claimed in claim 1, wherein the cable section end connectors are mechanically and electrically hermaphrodite and are identical.

13. The module as claimed in claim 1, wherein the casings comprise a port for the connection of at least one geophysical sensor outside the casing.

14. The module as claimed in claim 1, wherein the main body of each casing comprises two adapters and a cover, the adapters and the cover being fixed together in a nonremovable manner so that the casing does not comprise any connector for coupling to other casings.

15. The module as claimed in claim 1, wherein the main body of each casing comprises two adapters and a cover, wherein one of the adapters situated at the second end of each cable section is configured to be fixed in a removable manner to a casing.

16. A module comprising:
a plurality of tracks to generate geophysical signals; and
a plurality of casings linked in series by cable sections, at least one casing individually linked to one and only one track, each of the casings housing a processor to process the geophysical signals generated by a respective one of the tracks,
wherein two of the cable sections having a first end provided with a connector to detachably connect with a complementary connector of another module, and a second end configured to be attached to one of the casings, wherein a respective conductive element extending from each of the cable sections is coupled electrically to the processor housed in the respective casing, wherein the two of the cable sections are separated by at least one casing.

17. The module as claimed in claim 1, wherein the casing is connected to the cable sections without use of connectors.

18. A module comprising:
a plurality of tracks to generate geophysical signals;
a plurality of casings, at least one casing individually linked to one and only one track, each of the casings housing a processor to process the geophysical signals generated by a respective one of the tracks; and
a plurality of cable sections to link the plurality of casings in series, wherein each respective casing is connected to one end of one of the cable sections and one end of another one of the cable sections.

* * * * *